(12) United States Patent  
Abramov et al.

(10) Patent No.: US 7,982,162 B2  
(45) Date of Patent: Jul. 19, 2011

(54) METHOD AND APPARATUS FOR SCORING AND SEPARATING A BRITTLE MATERIAL WITH A SINGLE BEAM OF RADIATION

(75) Inventors: Anatoli Anatolyevich Abramov, Painted Post, NY (US); Yawei Sun, Horseheads, NY (US)

(73) Assignee: Corning Incorporated, Corning, NY (US)

(*) Notice: Subject to any disclaimer, the term of this patent is extended or adjusted under 35 U.S.C. 154(b) by 713 days.

(21) Appl. No.: 11/803,428

(22) Filed: May 15, 2007

(65) Prior Publication Data  
US 2008/0283509 A1   Nov. 20, 2008

(51) Int. Cl.  
*B23K 26/00* (2006.01)

(52) U.S. Cl. .................. 219/121.72; 225/2

(58) Field of Classification Search ............ 219/121.67, 219/121.72; 225/2, 93.5  
See application file for complete search history.

(56) References Cited

U.S. PATENT DOCUMENTS

| | | | |
|---|---|---|---|
| 5,254,833 A * | 10/1993 | Okiyama ............ | 219/121.68 |
| 5,609,284 A | 3/1997 | Kondratenko ............ | 225/1 |
| 5,622,540 A | 4/1997 | Stevens ............ | 65/112 |
| 5,692,284 A | 12/1997 | Carnell ............ | 29/275 |
| 5,776,220 A | 7/1998 | Allaire et al. ............ | 65/112 |
| 5,826,772 A | 10/1998 | Ariglio et al. ............ | 225/2 |
| 6,211,488 B1 * | 4/2001 | Hoekstra et al. ......... | 219/121.72 |
| 6,327,875 B1 | 12/2001 | Allaire et al. ............ | 65/103 |
| 6,420,678 B1 * | 7/2002 | Hoekstra ............ | 219/121.67 |
| 6,489,588 B1 * | 12/2002 | Hoekstra et al. ......... | 219/121.67 |
| 6,541,730 B2 | 4/2003 | Nam et al. ............ | 219/121.67 |
| 6,616,025 B1 | 9/2003 | Andrewlavage, Jr. ....... | 225/96.5 |
| 6,800,831 B1 | 10/2004 | Hoetzel ............ | 219/121.72 |
| 2003/0019897 A1 | 1/2003 | Chuang et al. ............ | 225/2 |
| 2004/0251290 A1 | 12/2004 | Kondratenko ............ | 225/2 |
| 2005/0006358 A1 | 1/2005 | Shigemasu et al. ...... | 219/121.69 |
| 2006/0021977 A1 | 2/2006 | Menegus ............ | 219/121.69 |
| 2006/0022008 A1 | 2/2006 | Brown et al. ............ | 225/1 |
| 2006/0097022 A1 | 5/2006 | Kim ............ | 225/93.5 |
| 2006/0101858 A1 * | 5/2006 | Fujii ............ | 65/29.18 |
| 2006/0249553 A1 | 11/2006 | Ukrainczyk ............ | 225/2 |

* cited by examiner

*Primary Examiner* — Geoffrey S Evans  
(74) *Attorney, Agent, or Firm* — Kevin M. Able

(57) ABSTRACT

A method and an apparatus for both scoring and separating a brittle material, and in particular a glass sheet or substrate, using only a single laser beam. A radiation zone created by the beam incident on the glass substrate, and the radiation zone is effectively formed into two portions by a coolant jet incident on the radiation zone. The radiation zone is separated into a leading portion, which generates a vent crack partially through a thickness of the substrate, and a trailing portion that propagates the vent crack through the remainder of the substrate, thereby separating the substrate.

18 Claims, 3 Drawing Sheets

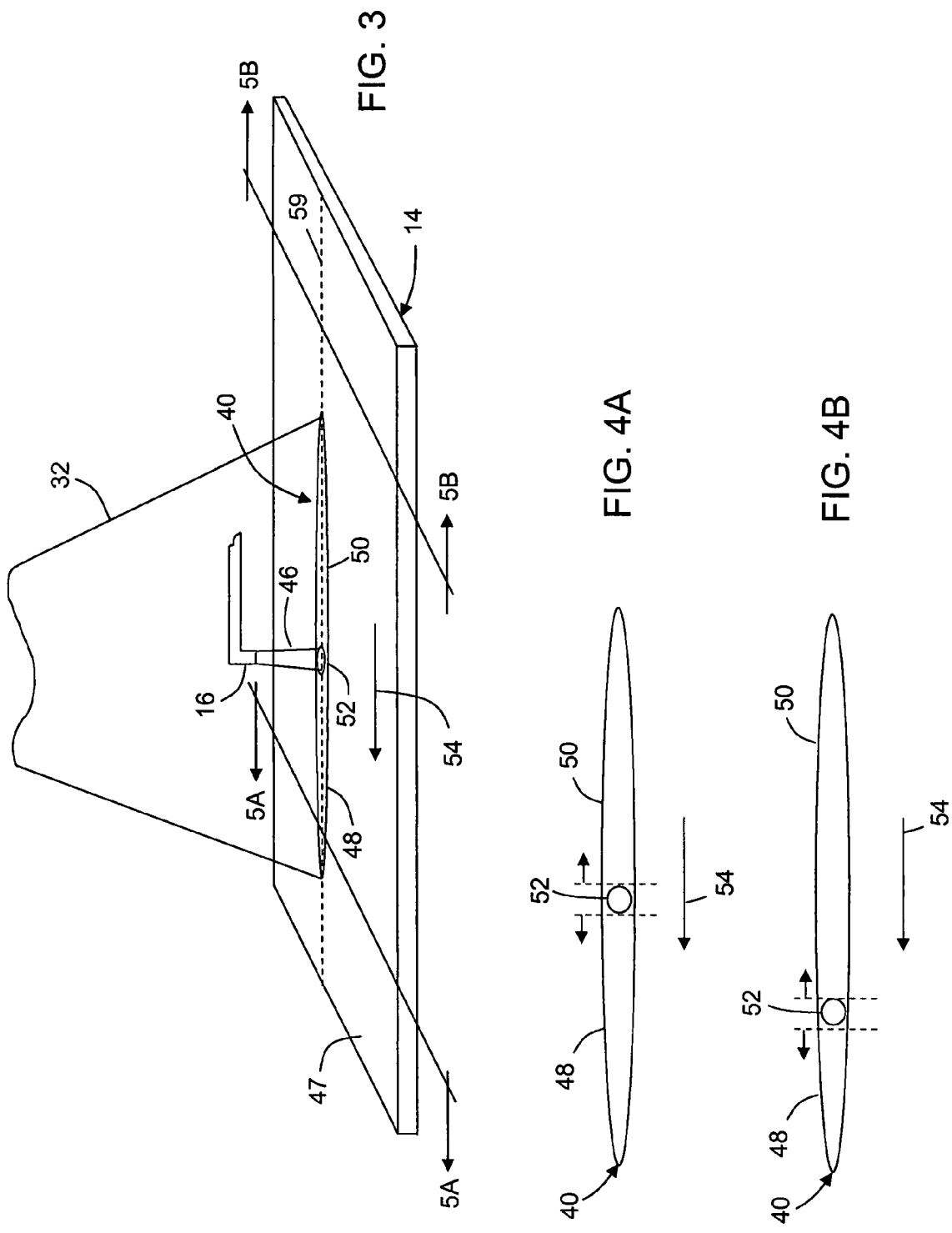

METHOD AND APPARATUS FOR SCORING AND SEPARATING A BRITTLE MATERIAL WITH A SINGLE BEAM OF RADIATION

BACKGROUND OF THE INVENTION

1. Field of the Invention

This invention relates to a method and apparatus for separating a brittle material, and more particularly, a method for both scoring and separating a glass substrate using only a single beam of radiation.

2. Technical Background

Sheets of glass are conventionally cut or separated by mechanical means, whereby the glass is scored along a predetermined path, and a mechanical bending force thereafter applied to one or both portion of the sheet to separate the sheet. During the scoring step, a median (vent) crack is formed which travels only a portion of the way through the thickness of the sheet.

In another conventional method, an initial flaw is placed in the sheet. A laser is then directed at the flaw, thereby heating the glass and extending the flaw along a predetermined path. U.S. Pat. No. 5,692,284 to Kondratenko describes a process wherein the beam spot has a short elliptical shape with the longest axis of the spot less than 20 mm. The reported scoring speed was low, and varied in the range between about 10-120 mm/sec, depending upon the glass type. U.S. Pat. No. 5,776,220 to Allaire, et al. teaches a significantly longer elliptical spot, with the longest axis greater than 40 mm. U.S. Pat. No. 6,211,488 to Hoekstra, et al. discloses using a plurality of laser beams preceding the scoring beam to increase the scoring speed. A similar approach based on using several beams to increase the scoring speed is taught in U.S. Pat. No. 6,800,831.

The separating step involved deepening the vent crack, either through a bending moment applied to the vent crack as described above, or by heating the score line with a laser to create tensile stress. For example, U.S. Pat. No. 6,541,730 describes using a second laser beam of circular or elliptical shape traveling behind the scoring beam.

The preceding techniques generally involve several steps and or laser beams to accomplish both the scoring and the separating functions. Such multiple step, multiple beam methods add cost, and complicate the optical implementation of the scoring and separating process. What is needed is a non-contact method of scoring and separating a brittle material (e.g. a glass substrate) in a single step, without the added complication of multiple beams from a plurality of radiation sources.

SUMMARY

The present invention makes possible both the scoring and separating of a sheet of brittle material with a single pass of a beam of radiation, and using only a single irradiation source.

In accordance with an embodiment of the present invention, a method of separating a sheet of brittle material is disclosed comprising providing the sheet of brittle material, forming an elongated radiation zone on the sheet, forming a cooling zone on the sheet that intersects the radiation zone to form a scoring portion and a separating portion of the radiation zone, and producing relative motion between the sheet and the intersecting radiation and cooling zones to score and separate the sheet. Beneficially, the sheet of brittle material is scored and separated in a single pass of the radiation zone and cooling zone over the surface of the brittle material, the radiation zone and the cooling zone preferably having a constant spatial relationship during the scoring and the separating. Preferably the brittle material is a glass sheet or substrate.

In another embodiment, a method of separating a brittle material is described comprising providing a sheet of brittle material, irradiating a surface of the sheet with an elongated laser beam to form an elongated radiation zone on the sheet, forming a cooling zone on the sheet that overlaps the radiation zone, and producing relative motion between the sheet of brittle material and the overlapping radiation and cooling zones to score and separate the sheet.

In still another embodiment, an apparatus for scoring and separating a brittle material is described comprising a laser source, at least one optical system for transforming a laser beam emitted by the laser source into an elongated beam and directing the elongated beam onto a surface of the brittle material, thereby forming a single radiation zone on the material, a nozzle for directing a stream of coolant to impinge on the surface of the brittle material, the impinging coolant intersecting the radiation zone so as to produce a leading portion and a trailing portion of the radiation zone relative to a direction of travel of the radiation zone and a transport device for producing relative motion between the brittle material and the intersecting radiation zone and impinging coolant, thereby scoring and separating the brittle material during a single pass of the radiation zone and impinging coolant.

Practicing the present invention can reduce the complexity of the equipment required to separate brittle materials such as glass sheets, reduce the time necessary to separate a brittle material by combining the scoring function with the separating function in a single pass of the scoring/separating beam, improve the efficacy of the scoring and separating process by providing for precise alignment of the scoring function with the separating function (i.e. alignment between the scoring portion of the beam and the separating portion of the beam) and improve the quality of the edges of the separated material be eliminating the need for mechanical scoring of the material and the inherent chipping that occurs.

Embodiments of the present invention may be used off-line to singly cut sheets of brittle material, or on-line, such as in a manufacturing operation for making glass sheets. For example, embodiments of the present invention may be installed as part of a downdraw glass forming operation, such as a fusion downdraw glass sheet process, to remove (separate) individual sheets of glass from a moving ribbon of glass and thereby replace present day mechanical scoring and breaking operations.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate an exemplary embodiment of the invention and, together with the description, serve to explain the principles and operations of the invention.

BRIEF DESCRIPTION OF THE DRAWINGS

FIG. 3 is a close-up perspective view of the area of FIG. 1 where the laser beam is incident on the surface of the glass substrate.

FIGS. 4A and 4B depict two embodiments wherein the jet of coolant overlaps the incident laser beam: where the radiation zone is generally bisected, and where the leading edge of the beam is shorter than the trailing edge.

DETAILED DESCRIPTION

Figure 1:
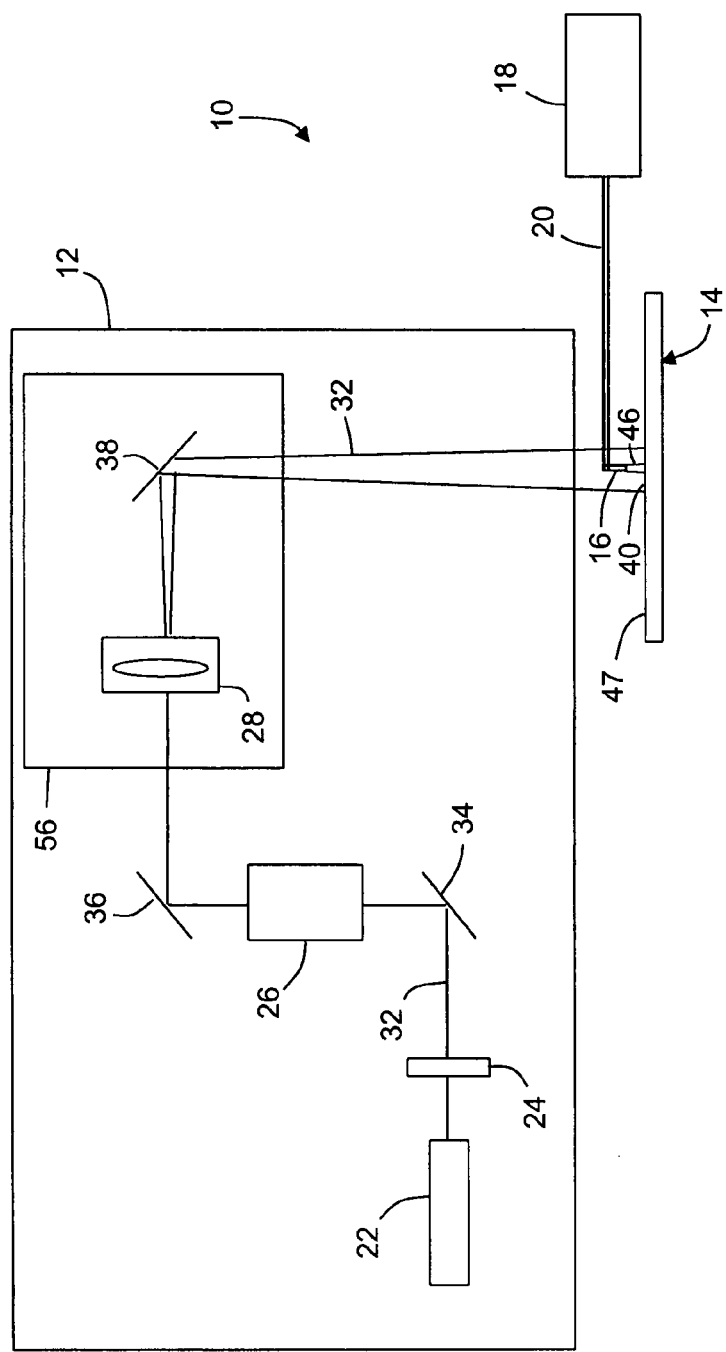
FIG. 1 is a diagrammatic view of an apparatus for separating a glass sheet or substrate according to an embodiment of the present invention.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Referring to FIG. 1, an apparatus 10 for cutting a brittle material in accordance with an embodiment of the present invention is shown. The brittle material may be, for example, a glass, a ceramic, or a glass ceramic article. For the purpose of further discussion, a glass substrate, and in particular a glass sheet suitable for use in the manufacture of liquid crystal displays will be hereinafter assumed and described. However, it should be noted that the present invention has applicability to the scoring and separation of other articles of manufacture.

Apparatus 10 comprises optical delivery system 12 for irradiating glass substrate (glass sheet) 14, and a coolant fluid delivery system comprising coolant nozzle 16, coolant source 18 and associated piping 20 necessary to convey the coolant to nozzle 16. Optical delivery system 12 comprises radiation source 22, circular polarizer 24, beam expander 26, and beam shaping system 28.

Optical delivery system 12 may further comprise optical elements for redirecting a beam of radiation 32 from radiation source 22, such as mirrors 34, 36 and 38. Irradiation source 22 is preferably a laser emitting a laser beam having a wavelength and a power suitable for heating the glass substrate at a location where the beam is incident on the glass substrate. In one embodiment, laser 22 is a $CO_2$ laser operating at a wavelength of 10.6 µm and with a power greater than or equal to 100 watts.

Figure 2:
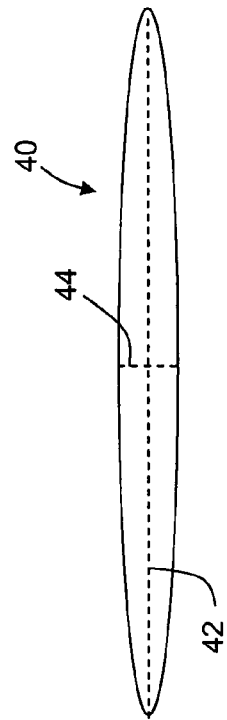
FIG. 2 is a top down view of the "radiation zone" a laser makes on the surface of a glass substrate when the laser beam emitted by the laser is incident on the surface of the substrate.

Laser beam 32 as emitted by laser 22 is typically substantially circular in cross section (i.e. the cross section of the beam at right angles to the longitudinal axis of the beam). Optical delivery system 12 is operable to transform laser beam 32 such that the beam has a significantly elongated shape when incident on glass substrate 14, producing an elongated footprint or "radiation zone" 40 on the substrate. The boundary of the radiation zone is determined as the point at which the beam intensity has been reduced to $1/e^2$ of its peak value. Beam 32 passes through circular polarizer 24 and is then expanded by passing through beam expander 26. The expanded laser beam then passes through beam shaping system, 28 to form a beam producing elongated radiation zone 40 on a surface of the substrate. Beam shaping system 28 may, for example, comprise one or more cylindrical lenses. However, it should be understood that any optical elements capable of shaping the beam emitted by laser 22 to produce an elongated radiation zone on substrate 14 may be used. A diagrammatic view of radiation zone 40 is shown in FIG. 2. Preferably, the major axis of radiation zone 40 is substantially longer than the minor axis 44. In some embodiments, for example, major axis 42 is at least about 10× longer than minor axis 44. In certain preferred embodiments, major axis 42 of radiation zone 40 is at least about 100 mm in length, but may be at least about 200 or even greater than 300 mm long, whereas minor axis 44 is typically less than about 2 mm, and may be as short as or shorter than 1.5 mm or even 1 mm. However, the length and width of radiation zone 40 are dependent upon the desired scoring/separation speed (beam translation speed), thickness of the glass sheet, laser power, etc., and the length and width of the radiation zone may be varied as needed.

As best seen in FIG. 3, coolant nozzle 16 delivers a jet 46 of coolant fluid to the surface 47 of glass substrate 14. In some embodiments, nozzle 16 has an internal diameter on the order of several hundred micrometers (e.g. 200-300 µm), and emits a substantially collimated jet of coolant having a diameter of typically about 300-400 µm at the surface of the glass. However, as with radiation zone 40, the diameter of nozzle 16, and the subsequent diameter of coolant jet 46, may be varied as needed for the particular process conditions. In some embodiments, the area of the glass substrate immediately impinged upon by the coolant (cooling zone) preferably has a diameter shorter than the minor axis of the radiation zone. However, in certain other embodiments, the diameter of the cooling zone may be larger than the minor axis of radiation zone 40 based on process conditions such as speed, glass thickness, laser power, etc. Indeed, the (cross sectional) shape of the coolant jet may be other than circular, and may, for example, have a fan shape such that the cooling zone forms a line rather than a circular spot on the surface of the glass sheet. A line-shaped cooling zone may be oriented, for example, perpendicular to the major axis of radiation zone 40. Other shapes may be beneficial.

Preferably, coolant jet 46 comprises water, but may be any suitable cooling fluid that does not stain or damage surface 47 of the glass substrate. In accordance with the present invention, cooling fluid jet 46 is delivered to a surface of glass substrate 14 thereby forming cooling zone 52 intersecting or overlapping radiation zone 40, effectively dividing the radiation zone into two portions, a leading portion 48 forward of the cooling zone and a trailing portion 50 behind the cooling zone, wherein both the leading and trailing portions are relative to the direction of travel of the beam indicated by arrow 54, and the leading and trailing portions are separated by cooling zone 52. By the term "forward of the cooling zone" what is meant is forward of the dashed line tangent to the left side of cooling zone 52 in FIGS. 4A and 4B, as indicated by the arrow attached to the dashed line. Similarly, "behind the cooling zone" refers to behind or to the right of the dashed line tangent to the right side of cooling zone 52 in FIGS. 4A and 4B, as indicated by the arrow attached to the dashed line. Cooling zone 52 may overlap radiation zone 40 at or near a midpoint of the radiation zone, as depicted in FIG. 4A, or cooling zone 52 may be nearer one end of radiation zone 40 than the other end of the radiation zone, as illustrated in FIG. 4B, as may be necessary to optimize the scoring and/or separation process.

To score and separate substrate 14, apparatus 10 may further comprise a means for developing relative motion between glass substrate 14 and beam 32 incident on the substrate (i.e. radiation zone 40). This may be accomplished by moving substrate 14 relative to beam 32, or by moving beam 32 (and therefore radiation zone 40) relative to the substrate. For large substrates, e.g. substrates having dimensions corresponding to an area of surface 47 in excess of several square meters, movement of the beam may be preferred. This is particularly true for very large thin substrates. For example, substrates used in the manufacture of optical displays can be less than 1 mm in thickness, and often less than about 0.7 mm, and may be larger than 10 square meters. Moving such large sheets of very thin glass may be impractical. Where moving the sheet is impractical, optical system 12 may be mounted on a suitable stage, such as an xy linear stage or gantry system, so that beam 32 and coolant 46 can be traversed over glass substrate 14. It should be noted that radiation zone 40 and cooling zone 52 move in unison so that the spatial relationship between the coolant zone and the radiation zone remain substantially constant. If optical system 12 is too large, even this approach may be impractical. Alternatively, many of the optical components, and glass substrate 14, may be maintained stationary during the scoring and separation process, and laser beam 32 directed to a "flying head" that is translated relative to and substantially parallel with glass substrate 14 for redirecting the beam onto the substrate. For example, flying head 56 may comprise beam shaping system 28 and mirror 38. In this instance, only the flying head need be moved to redirect the beam and traverse the beam across the substrate. Methods for moving the sheet, or optical system 12, or just flying head 56 are well known in the art and will not be described further.

Figure 5A:
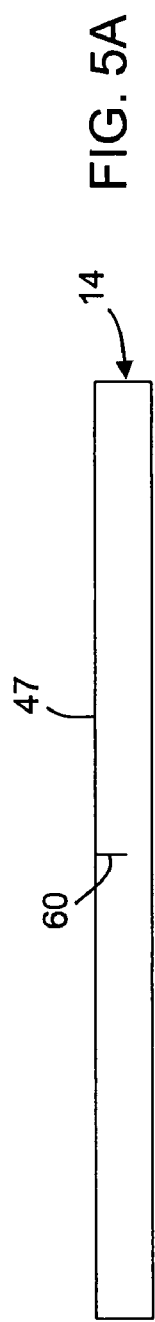
FIGS. 5A and 5B depict cross sectional views of the glass substrate showing how the vent crack is propagated only partially through the glass substrate by the leading portion of the laser radiation zone, whereas the vent crack is propagated entirely through the thickness of the glass by the trailing portion of the radiation zone.
Figure 5B:
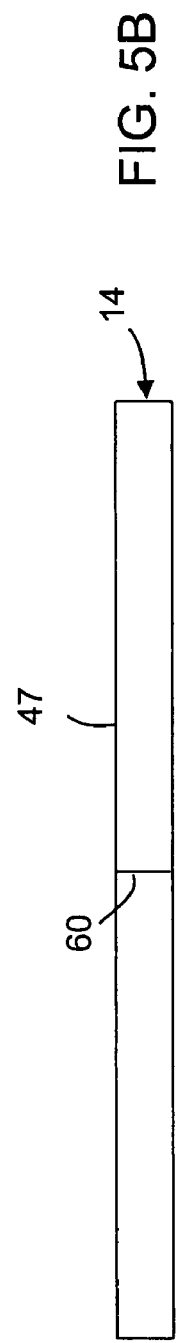

As radiation zone 40 is traversed across surface 47 of substrate 14, the radiation zone heats glass substrate 14. Impinging cooling jet 46 onto surface 47 in a manner that intersects radiation zone 40 effectively splits radiation zone 40 into two portions 48 and 50 by producing overlapping cooling zone 52. As shown in FIG. 4A, as radiation zone 40 is traversed in a direction indicated by arrow 54, the leading portion 48 of radiation zone 40 performs a scoring function, whereas the trailing portion 50 of radiation zone 40 performs a separating function. As leading portion 48 of radiation zone 40 traverses the substrate along scoring path 59 (FIG. 3), the substrate is heated. Coolant jet 46 rapidly cools or quenches the heated portion of the substrate (via cooling zone 52), thereby causing vent crack 60 to form, extending from the incident surface 47 of the substrate (the surface on which laser beam 32 is incident) to a partial depth within the body of glass sheet 14, as illustrated in FIG. 5A. That is, vent crack 60 only partially traverses through the thickness of the substrate. The trailing portion 50 of the radiation zone following directly behind the leading portion of the radiation zone then reheats the quenched portion of the substrate, causing the vent crack to extend through the thickness of the substrate, as shown in FIG. 5B, thereby separating the substrate along line 59 (FIG. 3).

The separating speed (e.g. the traverse rate of the beam over the surface of the substrate) may be controlled, for example, by repositioning the point 52 at which coolant jet 46 is incident on substrate 14 relative to radiation zone 40. For example, cooling zone 52 may be positioned closer or further from any particular end of radiation zone 40 (i.e. placed off center) to optimize the scoring and/or separating.

Figure 6:
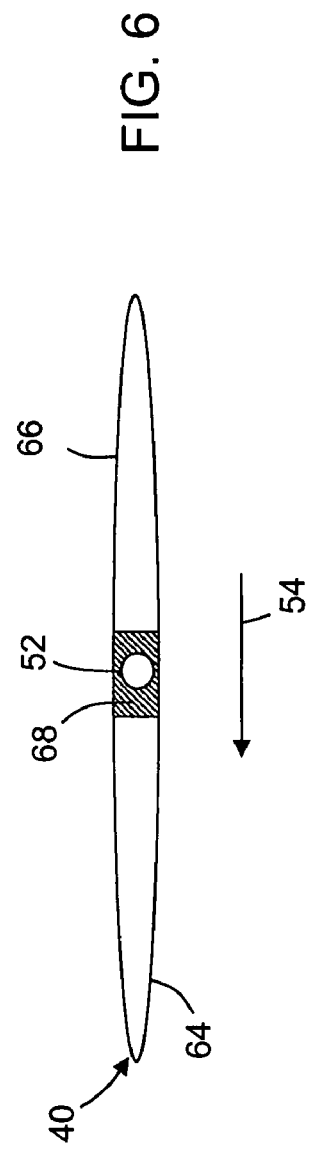
FIG. 6 is a top down view of another embodiment according to the present invention wherein a single laser beam is masked to produce two elongated radiation zones separated by a cooling zone created by an impinging coolant.

In another embodiment shown in FIG. 6 according to the present invention, a portion of laser beam 32 may be masked, thereby creating two co-linear elongated radiation zones 64, 66 from a single beam. By co-linear what is meant is that the major (longest) axis of each radiation zone lies on a single line. Masking of beam 32 may be accomplished, for example, by placing an appropriately shaped obstacle (mask—not shown) in the path of beam 32. Coolant jet 46 may then be directed onto glass substrate 14 to produce cooling zone 52 within the masked portion 68 of beam 32 between radiation zones 64, 66. Similar to the previous embodiment, placement of the masked region, and the subsequent placement of cooling zone 52 within the masked portion, can be used to control the thermal gradient produced by the beam and the coolant, and subsequently the depth of the initial scoring vent crack. As in the previous embodiment, beam 32 and coolant jet 46 move in unison so that no relative motion between the radiation zone(s) and the cooling zone takes place.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of separating a sheet of brittle material comprising:
   providing a sheet of brittle material, the sheet of brittle material comprising a thickness;
   forming an elongated radiation zone on the sheet of brittle material;
   forming a cooling zone on the sheet of brittle material by impinging a coolant fluid onto the sheet of brittle material, wherein the cooling zone intersects the radiation zone such that the elongated radiation zone simultaneously forms a scoring portion and a separating portion;
   producing relative motion between the sheet of brittle material and the intersecting radiation and cooling zones, thereby heating the sheet of brittle material with the scoring portion and cooling the heated sheet of brittle material with the cooling zone to form a crack that only partially traverses the thickness of the sheet of brittle material;
   reheating the cooled sheet of brittle material with the separating portion of the radiation zone; and
   wherein the reheating with the separating portion of the radiation zone causes the crack to extend completely through the thickness of the sheet of brittle material, thereby separating the sheet of brittle material.

2. The method according to claim 1 wherein the scoring portion and the separating portion have unequal lengths.

3. The method according to claim 1 wherein the sheet of brittle material is a glass or glass ceramic.

4. The method according to claim 1 wherein the scoring portion and the separating portion have equal lengths.

5. The method according to claim 1 wherein the forming an elongated radiation zone comprises irradiating the sheet of brittle material with a laser beam.

6. The method according to claim 5 wherein the forming a cooling zone comprises masking a portion of the laser beam.

7. A method of separating a sheet of brittle material comprising:
- providing a sheet of brittle material, the sheet of brittle material comprising a thickness;
- irradiating a surface of the sheet of brittle material with an elongated laser beam to form an elongated radiation zone on the sheet of brittle material;
- forming a cooling zone on the sheet of brittle material by impinging a coolant fluid onto the sheet of brittle material, wherein the cooling zone overlaps the radiation zone such that the elongated radiation zone is divided into a scoring portion and a separating portion that exist simultaneously;
- producing relative motion between the sheet of brittle material and the overlapping radiation and cooling zones, thereby heating the sheet of brittle material with the scoring portion and cooling the heated sheet of brittle material with the cooling zone to form a crack that only partially traverses the thickness of the sheet of brittle material;
- reheating the cooled sheet of brittle material with the separating portion of the radiation zone; and
- wherein the reheating with the separating portion of the radiation zone causes the crack to extend completely through the thickness of the sheet of brittle material, thereby separating the sheet of brittle material.

8. The method according to claim 7 wherein the brittle material is a glass or glass ceramic.

9. The method according to claim 7 wherein the scoring portion and the separating portion have equal lengths.

10. The method according to claim 7 wherein the scoring portion and the separating portion have unequal lengths.

11. The method according to claim 7 wherein the forming a cooling zone comprises masking a portion of the laser beam.

12. An apparatus for scoring and separating a sheet of brittle material comprising:
- a laser source;
- at least one optical system for transforming a laser beam emitted by the laser source into an elongated beam and directing the elongated beam onto a surface of the sheet of brittle material, thereby forming a radiation zone on the material;
- a nozzle for directing a stream of coolant to impinge on the surface of the brittle material, the impinging coolant intersecting the radiation zone between a leading portion and a trailing portion of the radiation zone relative to a direction of travel of the radiation zone such that the radiation zone simultaneously forms a scoring portion and a separating portion; and
- a transport device for producing relative motion between the sheet of brittle material and the intersecting radiation zone and impinging coolant, thereby scoring the sheet of brittle material with the scoring portion of the radiation zone and separating the sheet of brittle material with the separating portion of the radiation zone during a single pass of the radiation zone and impinging coolant, wherein heating the sheet of brittle material with the scoring portion and cooling the heated sheet of brittle material with the impinging coolant forms a crack that only partially traverses the thickness of the sheet of brittle material, and reheating the cooled sheet of brittle material with the separating portion of the radiation zone causes the crack to extend completely through the thickness of the sheet of brittle material, thereby separating the sheet of brittle material.

13. The apparatus according to claim 12 wherein the elongated beam has a length equal to or greater than 100 mm.

14. The apparatus according to claim 12 wherein the elongated beam has a length equal to or greater than 300 mm.

15. The apparatus according to claim 12 wherein the coolant impinges at a midpoint of the radiation zone.

16. The apparatus according to claim 12 wherein the coolant impinges nearer one end of the radiation zone than the other end of the radiation zone.

17. The apparatus according to claim 12 further comprising a mask for masking a portion of the laser beam.

18. An apparatus for scoring and separating a sheet of brittle material comprising:
- a laser source;
- at least one optical system for transforming a laser beam emitted by the laser source into an elongated beam and directing the elongated beam onto a surface of the sheet of brittle material, thereby forming a radiation zone on the material;
- a nozzle for directing a stream of coolant to impinge on the surface of the sheet of brittle material, the impinging coolant intersecting the radiation zone between a leading portion and a trailing portion of the radiation zone relative to a direction of travel of the radiation zone such that the radiation zone simultaneously forms a scoring portion and a separating portion; and
- a transport device for producing relative motion between the sheet of brittle material and the intersecting radiation zone and impinging coolant, thereby scoring the sheet of brittle material with the scoring portion of the radiation zone and separating the sheet of brittle material with the separating portion of the radiation zone during a single pass of the radiation zone and impinging coolant,
- wherein the elongated beam has a length equal to or greater than 300 mm.

* * * * *